US012736011B1

(12) United States Patent
Dittmar et al.

(10) Patent No.: US 12,736,011 B1
(45) Date of Patent: Sep. 15, 2026

(54) DISTILLATION SYSTEM TEMPERATURE CONTROL SYSTEM

(71) Applicant: HONEYWELL INTERNATIONAL INC., Charlotte, NC (US)

(72) Inventors: Kevin Dittmar, Phoenix, AZ (US); Eric Shepard, Phoenix, AZ (US); Jeffrey Maldonado, Phoenix, AZ (US); Matthew Dunn, Phoenix, AZ (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 0 days.

(21) Appl. No.: 19/282,186

(22) Filed: Jul. 28, 2025

(51) Int. Cl.
*F02C 9/18* (2006.01)
*C02F 1/16* (2023.01)
*F02C 6/18* (2006.01)

(52) U.S. Cl.
CPC .................. *F02C 9/18* (2013.01); *C02F 1/16* (2013.01); *F02C 6/18* (2013.01); *F05D 2270/303* (2013.01)

(58) Field of Classification Search
CPC ...... F02C 9/18; F02C 6/18; F02C 6/08; C02F 1/16; F05D 2270/303; F01D 17/085
See application file for complete search history.

(56) References Cited

U.S. PATENT DOCUMENTS 3,584,459 A 6/1971 Amann
4,372,125 A 2/1983 Dickenson
7,445,424 B1 11/2008 Ebert et al.
7,549,292 B2 6/2009 Peck et al.
9,068,506 B2 6/2015 Eleftheriou et al.
11,435,083 B2 9/2022 Cosic et al.
12,173,669 B1 12/2024 Miller et al.
12,270,340 B2 4/2025 Wang et al.
12,276,225 B2 4/2025 Murray et al.
12,352,207 B1 * 7/2025 Rambo .................... F02C 3/30
12,454,919 B2 * 10/2025 Rizkalla .................... F02C 6/08
12,515,145 B2 * 1/2026 Juranitch ............... B01D 3/007
(Continued)

FOREIGN PATENT DOCUMENTS

GB 2615316 A1 8/2023

OTHER PUBLICATIONS

Brent A Gregory and Oleg Moroz, Gas Turbines: Monitor engine cooling-air flows to enable top performance, Dec. 31, 2024.

*Primary Examiner* — Andrew H Nguyen
(74) *Attorney, Agent, or Firm* — Ingrassia Fisher & Lorenz LLP

(57) ABSTRACT

A gas turbine engine system includes a gas turbine engine, a bypass duct, and a bypass control valve. The gas turbine engine includes at least a compressor section, a combustion section, and a turbine section. The bypass duct has a bypass duct inlet that is disposed between the compressor section and the combustion section, and a bypass duct outlet that is disposed downstream of the turbine section. The bypass control valve is disposed on the bypass duct and is moveable to a commanded valve position, which is one of a closed position, in which compressed air from the compressor section does not flow through the bypass duct, and a plurality of open positions, in which compressed air discharged from the compressor section flows through the bypass duct and mixes with exhaust gas discharged from the turbine section to form the discharge gas that is supplied to the main chamber.

8 Claims, 3 Drawing Sheets

(56) References Cited

U.S. PATENT DOCUMENTS

| | | | | |
|---|---|---|---|---|
| 2006/0254280 | A1 * | 11/2006 | Briesch | F01D 19/00 60/39.182 |
| 2007/0084205 | A1 * | 4/2007 | Teets | F01D 15/10 60/597 |
| 2017/0030228 | A1 * | 2/2017 | Jordan, Jr. | F02C 7/18 |
| 2024/0271548 | A1 | 8/2024 | Terwilliger et al. | |
| 2024/0410314 | A1 | 12/2024 | Sobanski | |

* cited by examiner

DISTILLATION SYSTEM TEMPERATURE CONTROL SYSTEM

TECHNICAL FIELD

The present disclosure generally relates to distillation systems, and more particularly to a distillation system temperature control system.

BACKGROUND

Various industrial processes, including hydraulic fracturing (i.e., fracking), produce wastewater. The wastewater that is produced may include dissolved salts, metals, and other contaminants. Preferably, this wastewater undergoes a treatment process to remove the dissolved salts, metals, and other contaminants so that the recovered, clean water can be reused in future fracking operations or various other purposes such as, for example, agricultural irrigation. Various treatment processes are used to treat such wastewater. These include membrane filtration (like reverse osmosis), chemical precipitation, advanced oxidation processes, and distillation.

A typical distillation process involves heating the wastewater, which separates the water from the dissolved salts, metals, and other contaminants. The water vapor is then condensed to produce clean water for reuse. One particular distillation system that has been proposed is to use the exhaust gas from a gas turbine engine to heat the wastewater within a tank. However, if the temperature of the exhaust gas from the gas turbine engine is not properly controlled, system performance can be adversely impacted.

Hence, there is a need for a distillation system that uses exhaust gas from a gas turbine engine to treat wastewater in a tank and that controls the temperature of the exhaust gas from the gas turbine engine so as to achieve the desired system performance. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a distillation system temperature control system includes a tank, a diffuser, and a gas turbine engine system. The tank has a first end wall, a second end wall, a front wall, a back wall, a top wall, and a bottom wall that together define an inner volume. A divider wall is disposed within the tank and divides the inner volume into a main chamber and a settling chamber. The main chamber has at least a fluid inlet port and an exhaust gas inlet port, the settling chamber has at least an exhaust gas outlet port, and the divider wall has an opening formed therein that provides fluid communication between the main chamber and the settling chamber. The diffuser is disposed within the main chamber and is coupled to the exhaust gas inlet port. The gas turbine engine system is in fluid communication with the exhaust gas inlet port and is configured, during operation, to supply a discharge gas to the exhaust gas inlet port. The gas turbine engine system includes a gas turbine engine, a bypass duct, and a bypass control valve. The gas turbine engine includes at least a compressor section, a combustion section, and a turbine section. The bypass duct has a bypass duct inlet and a bypass duct outlet. The bypass duct inlet is disposed between the compressor section and the combustion section to receive compressed air discharged from the compressor section, and the bypass duct outlet is disposed downstream of the turbine section. The bypass control valve is disposed on the bypass duct and is moveable to a commanded valve position. The commanded valve position is one of a closed position, in which compressed air from the compressor section does not flow through the bypass duct, and a plurality of open positions, in which compressed air discharged from the compressor section flows through the bypass duct and mixes with exhaust gas discharged from the turbine section to form the discharge gas that is supplied to the exhaust gas inlet port.

In another embodiment, a gas turbine engine system includes a gas turbine engine, a bypass duct, and a bypass control valve. The gas turbine engine includes at least a compressor section, a combustion section, and a turbine section. The bypass duct has a bypass duct inlet and a bypass duct outlet. The bypass duct inlet is disposed between the compressor section and the combustion section to receive compressed air discharged from the compressor section. The bypass duct outlet is disposed downstream of the turbine section. The bypass control valve is disposed on the bypass duct and is moveable to a commanded valve position. The commanded valve position being one of a closed position, in which compressed air from the compressor section does not flow through the bypass duct, and a plurality of open positions, in which compressed air discharged from the compressor section flows through the bypass duct and mixes with exhaust gas discharged from the turbine section to form the discharge gas that is supplied to the main chamber.

In yet another embodiment, a method of controlling temperature in a distillation system that comprises a tank, a diffuser, a gas turbine engine, a bypass duct, and a bypass control valve, wherein (i) the tank has a first end wall, a second end wall, a front wall, a back wall, a top wall, and a bottom wall that together define an inner volume, a divider wall disposed within the tank and dividing the inner volume into a main chamber and a settling chamber, the main chamber having at least a fluid inlet port and an exhaust gas inlet port, the exhaust gas inlet port coupled to receive a flow of discharge gas, (ii) the diffuser is disposed within the main chamber and is coupled to the exhaust gas inlet port, (iii) the gas turbine engine is in fluid communication with the exhaust gas inlet port, and includes at least a compressor section, a combustion section, and a turbine section, and is configured, during operation thereof, to discharge exhaust gas, (iv) the bypass duct has a bypass duct inlet disposed between the compressor section and the combustion section to receive compressed air discharged from the compressor section, and a bypass duct outlet disposed downstream of the turbine section, (v) the bypass control valve is mounted on the bypass duct and is movable to a commanded valve position. The method includes the steps of: sensing, via a temperature sensor, temperature of the discharge gas supplied to the exhaust gas inlet port and supplying a temperature signal indicative of the sensed temperature, and commanding, via a valve control in operable communication with the temperature sensor and the bypass control valve, the bypass control valve to move to a commanded position based at least in part on the temperature sensor signal, to thereby control: (i) an amount of compressed air that flows through the bypass duct and mixes with exhaust gas discharged from the turbine section to form the discharge gas that is supplied to the main chamber, and (ii) the temperature of the discharge gas.

Furthermore, other desirable features and characteristics of the distillation system temperature control system will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figure, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
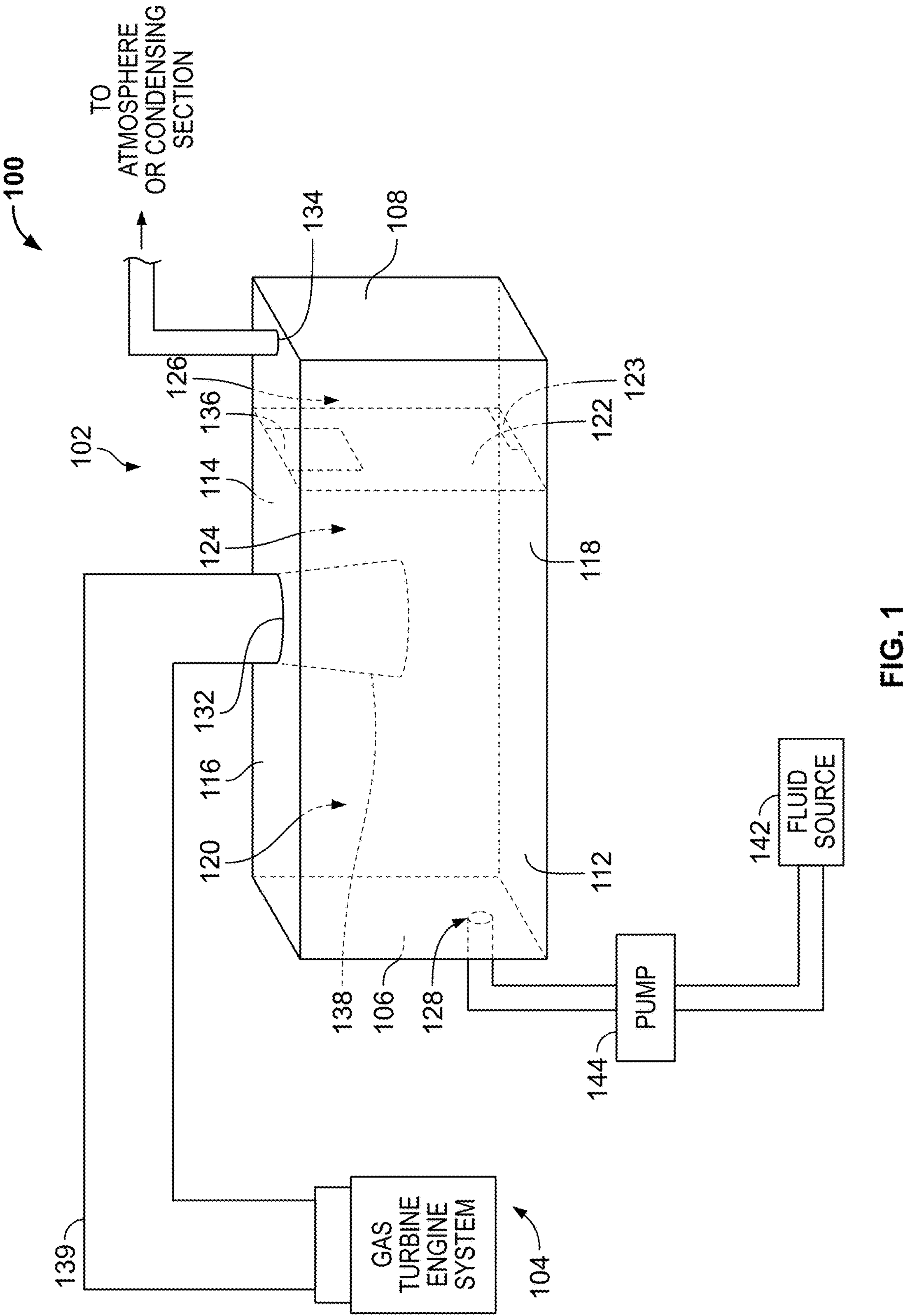
FIG. 1 depicts a simplified functional schematic diagram of one embodiment of a distillation system with temperature control.

Referring now to FIG. 1, a simplified functional schematic diagram of one embodiment of a distillation system 100 is depicted and includes a tank 102 and a gas turbine engine system 104. The tank 102 has a first end wall 106, a second end wall 108, a front wall 112, a back wall 114, a top wall 116, and a bottom wall 118. Together, the walls 106-116 define an inner volume 120.

As FIG. 1 also depicts, a divider wall 122 is disposed within the tank 102 and divides the inner volume 120 into a main chamber 124 and a settling chamber 126. The main chamber 124 has at least a fluid inlet port 128 and an exhaust gas inlet port 132, and the settling chamber 126 at least an exhaust gas outlet port 134. The divider wall 122 has a divider wall opening 136 formed therein that provides fluid communication between the main chamber 124 and the settling chamber 126. It should be noted that the exhaust gas outlet port 134 may be variously sized to meet desired performance characteristics. Preferably, however, it has a relatively large diameter to reduce the velocity of the gas being discharged and to reduce any entrained mist within the gas. In one embodiment, the exhaust gas outlet port 134 has a 36-inch diameter.

The gas turbine engine system 104, an embodiment of which will be described in more detail further below, is in fluid communication with the exhaust gas inlet port 132 and is configured, during operation, to supply a discharge gas to the exhaust gas inlet port 132. In some embodiments, such as the one depicted in FIG. 1, an exhaust duct 139 is coupled between the gas turbine engine system 104 and the exhaust gas inlet port 132. The exhaust duct 139, when included, is configured to direct the discharge gas from the gas turbine engine system 104 into the exhaust gas inlet port 132, which directs the discharge gas into the main chamber 124 via a diffuser 138 that is disposed within the main chamber 124.

Before proceeding further, it is noted that the diffuser 138 functions to slow the flow of the discharge gas supplied by the gas turbine engine system 104. The diffuser 138 additionally functions to promote discharge gas flow distribution along the length of the main chamber 124 to better interact with the fluid (not shown in FIG. 1), such as wastewater, that is supplied to the inner volume 120 of the tank 102. It will be appreciated that the sides of the diffuser 138 may be disposed at any one of numerous angles relative to exhaust gas inlet port 132. In one particular embodiment, the sides are angled at about 5-degrees. However, this angle may vary as needed to meet desired performance characteristics.

In addition to the diffuser 138, additional structural features are included within the inner volume 120 of the tank 102 to further improve the distillation process implemented by the distillation system 100. A description of the additional structural features is not needed to enable the claimed invention. Thus, these additional structural features are not depicted in FIG. 1 and a description thereof will not be provided.

As FIG. 1 further depicts, at least one fluid opening 123 extends through the divider wall 122 and is located adjacent to the bottom wall 118 of the tank 102. The fluid opening 123 provides fluid communication between the settling chamber 126 and the main chamber 124 to allow any fluid that condenses within the settling chamber 126 to flow into the main chamber 124.

It should be noted that during operation of the distillation system 100, fluid within the main chamber 124 is maintained at or above a predetermined fluid level. Although various techniques could be used to maintain the fluid within the main chamber 124 at or above the predetermined fluid level, in the depicted embodiment, and as FIG. 1 further depicts, the distillation system 100 may additionally include at least a fluid source 142 and a fluid pump 144.

The fluid source 142, which may be variously configured, is the source of the fluid that is to be distilled by the distillation system 100. The fluid pump 144 is disposed between, and is in fluid communication with, the fluid source 142 and the main chamber 124. The fluid pump 144, which may be implemented using any one of numerous known fluid pumps, is configured to maintain the fluid within the main chamber 124 at or above the predetermined fluid level. It will be appreciated that in some embodiments, the distillation system 100 may also include a non-illustrated fluid level sensor. The fluid level sensor, when included, may be disposed on or within the tank 102 and is configured to sense the fluid level within the main chamber 124 and supply a fluid level signal to the fluid pump 144.

Figure 2:
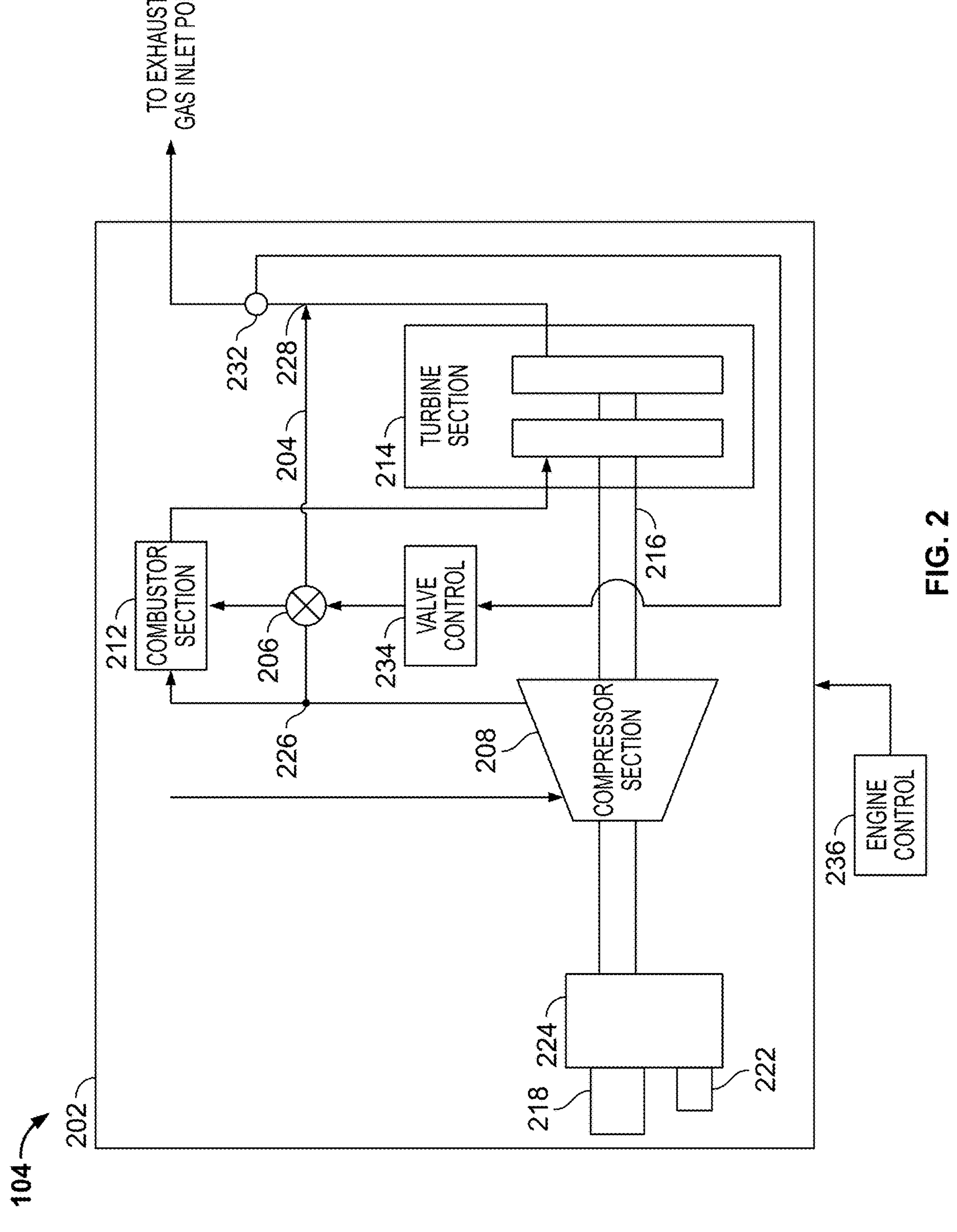
FIG. 2 depicts a functional schematic diagram of a gas turbine engine system that may be used with the distillation system of FIG. 1 to provide the temperature control.
Figure 3:
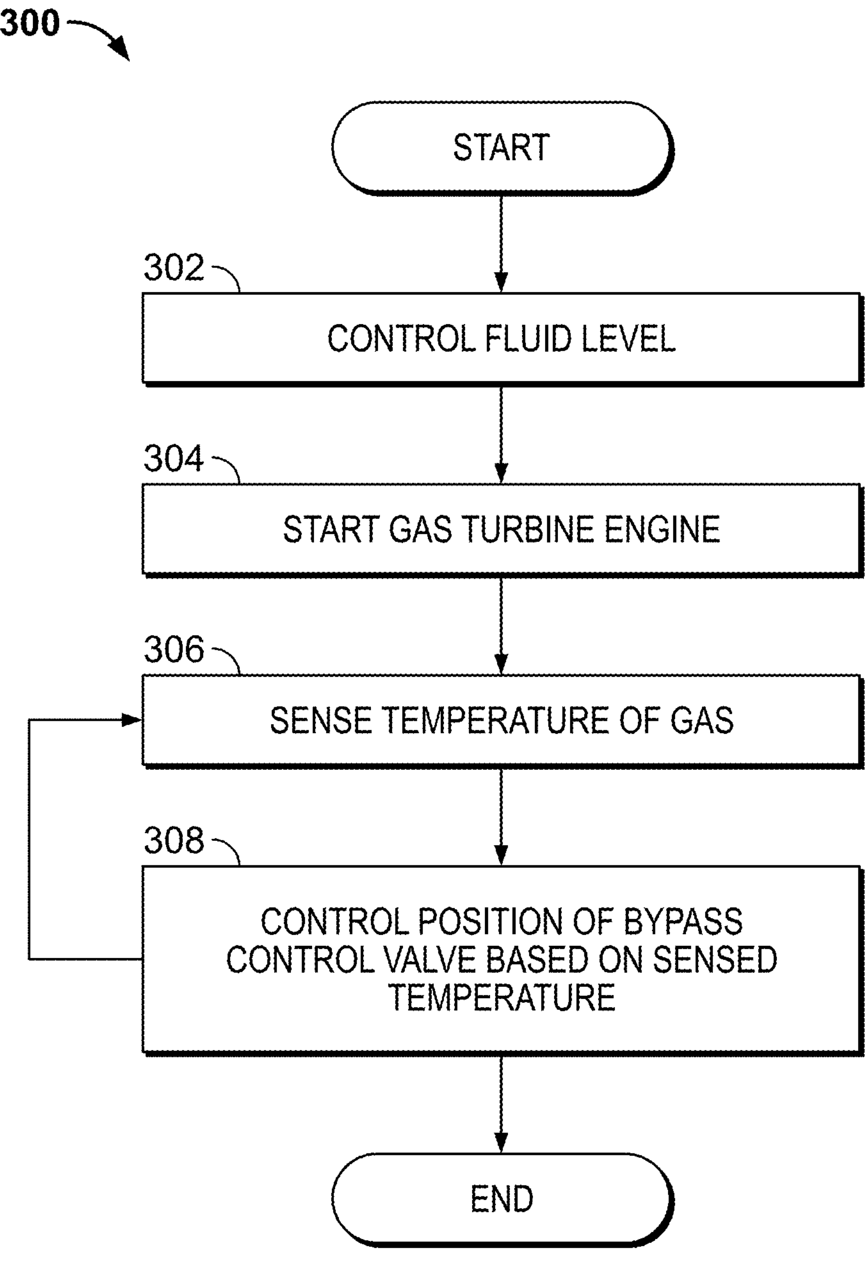
FIG. 3 depicts a process, in flowchart form, of controlling temperature in the distillation system of FIG. 1.

Turning now to FIG. 2, a description of the gas turbine engine system 104, will be provided. Before doing so, however, it should be noted that although the gas turbine engine system 104 is described herein as being implemented in the distillation system 100 of FIG. 1, it may also be implemented in numerous other systems where it is needed or desired to control the temperature of the gas discharged from the gas turbine engine system 104. With this in mind, and as FIG. 2 depicts, the gas turbine engine system 104 includes a gas turbine engine 202, a bypass duct 204, a bypass control valve 206. The gas turbine engine 202 includes at least a compressor section 208, a combustion section 212, and a turbine section 214. It will be appreciated that the gas turbine engine 202 may be implemented using any one of numerous types of gas turbine engines 202. In one particular embodiment, however, the gas turbine engine 202 is implemented using an auxiliary power unit (APU), such as an APU that is typically configured for use in commercial aircraft.

As is generally known, the compressor section 208 includes one or more compressors (only one depicted) that, during operation, draw in air from the surrounding environment and raises the pressure to a relatively high level. The compressed air from the compressor section 208 is the directed into the combustion section 212, where it is mixed with fuel and is combusted. The high-temperature combusted air then flows into the turbine section 214, causing rotationally mounted turbine blades to rotate and generate energy. Exhaust gas is then discharged from the turbine section 214.

As is also generally known, the rotating turbine blades are coupled to a shaft 216, which is used to drive the compressors in the compressor section 208. As FIG. 1 also depicts, the shaft 216 may also be used to drive various other loads, such as a generator 218 and or one or more other accessories 222, via a gearbox 224.

The bypass duct 204 has a bypass duct inlet 226 and a bypass duct outlet 228. The bypass duct inlet 226 is disposed between the compressor section 208 and the combustion section 212 and thus receives compressed air (or at least a portion thereof) that is discharged from the compressor section 208. The bypass duct outlet 228 is disposed downstream of the turbine section 214.

The bypass control valve 206 is disposed on the bypass duct 204 and is moveable to a commanded valve position, which is either a closed position or a plurality of open positions. In the closed position, compressed air from the compressor section does not flow through the bypass duct 204. In any one of the plurality of open positions, at least a portion of the compressed air that is discharged from the compressor section 208 flows through the bypass duct 204. The compressed air that exits the bypass duct outlet 228 mixes with exhaust gas that is discharged from the turbine section 214 to form the discharge gas that is supplied to the main chamber 124.

The gas turbine engine system 104 may additionally include a temperature sensor 232 and a valve control 234. The temperature sensor 232 is disposed downstream of the bypass duct outlet 228 and is configured to sense the temperature of the discharge gas that is supplied to the exhaust gas inlet port 132. The temperature sensor supplies a temperature sensor signal, to the valve control 234, that is indicative of the sensed discharge gas temperature.

The valve control 234 is in operable communication with the bypass control valve 206 and is coupled to receive the temperature sensor signal from the temperature sensor 232. The valve control 234 is configured to supply valve commands to the bypass control valve 206 based upon the temperature signal. In such embodiments, the bypass control valve 206 is configured, in response to the valve commands, to move to the commanded valve position.

The gas turbine engine system 104, at least in the depicted embodiment, additionally includes an engine control 236 that is in operable communication with the gas turbine engine 202. The engine control 236 is configured to control the operation of the gas turbine engine 202. Although the valve control 234 and engine control 236 are depicted in FIG. 2 using separate functional blocks, it will be appreciated that the valve control 234 and the engine control 236 may be integrally formed and/or may be disposed within a common housing.

Regardless of where and how the valve and engine controls 234, 236 are specifically implemented, it should be noted that by controlling the flow of compressed air through the bypass duct, and thus the volume of compressed air that mixes with exhaust gas discharged from the turbine section, the temperature of the discharge gas that is supplied to the exhaust gas inlet port 132, and thus the tank inner volume 120, can be accurately and precisely controlled. Actively controlling the temperature of the discharge gas, via the temperature sensor 232 and valve control 234, allows the temperature of the discharge gas to be controlled irrespective of the water level in the tank 102 or any environmental factors surrounding the distillation system 100.

Having described the overall structure of the distillation system 100 and the gas turbine engine system 200, the operation 300 of the distillation system 100 will now be briefly described. In doing so, reference should be made to FIGS. 1-2. Before the gas turbine engine 202 is started, the fluid pump 144 is operated to supply fluid, from the fluid source 142, to the tank 102, and is then used to maintain the fluid level at the predetermined fluid level (302). Thereafter, the gas turbine engine 202 is started (304).

After the gas turbine engine 202 is started, the exhaust gas that is discharged from the gas turbine engine 202 is directed, via the exhaust duct 139 and diffuser 138, into the main chamber 124. The temperature of the gas in the exhaust duct 139, downstream of the gas turbine engine 202 and upstream of the exhaust gas inlet port 132, is sensed by the temperature sensor 232 (306), and the valve control 234, based at least in part on the sensed temperature, controls the temperature of the gas supplied to the exhaust gas inlet port 132 by controlling the position of the bypass control valve 206 (308).

The distillation system disclosed herein uses exhaust gas from a gas turbine engine to treat wastewater in a tank and controls the temperature of the exhaust gas from the gas turbine engine so as to achieve desired system performance.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A distillation system temperature control system, comprising:

a tank having a first end wall, a second end wall, a front wall, a back wall, a top wall, and a bottom wall that together define an inner volume, a divider wall disposed within the tank and dividing the inner volume into a main chamber and a settling chamber, the main chamber having at least a fluid inlet port and an exhaust gas inlet port, the settling chamber having at least an exhaust gas outlet port, the divider wall having an opening formed therein that provides fluid communication between the main chamber and the settling chamber;

a diffuser disposed within the main chamber and coupled to the exhaust gas inlet port; and a gas turbine engine system in fluid communication with the exhaust gas inlet port, the gas turbine engine system configured, during operation thereof, to supply a discharge gas to the exhaust gas inlet port, the gas turbine engine system comprising:

a gas turbine engine including at least a compressor section, a combustion section, and a turbine section;

a bypass duct having a bypass duct inlet and a bypass duct outlet, the bypass duct inlet disposed between the compressor section and the combustion section to receive compressed air discharged from the compressor section, the bypass duct outlet disposed downstream of the turbine section; and a bypass control valve disposed on the bypass duct and moveable to a commanded valve position, the commanded valve position being one of a closed position, in which compressed air from the compressor section does not flow through the bypass duct, and a plurality of open positions, in which compressed air discharged from the compressor section flows through the bypass duct and mixes with exhaust gas discharged from the turbine section to form the discharge gas that is supplied to the exhaust gas inlet port.

2. The distillation system of claim 1, wherein:

the system further comprises a valve control in operable communication with the bypass control valve, the valve control configured to selectively supply valve commands to the bypass control valve;

the bypass control valve is configured, in response to the valve commands, to move to the commanded valve position.

3. The distillation system of claim 2, further comprising:

a temperature sensor disposed downstream of the bypass duct outlet, the temperature sensor configured to sense temperature of the discharge gas and supply a temperature sensor signal indicative thereof, wherein the valve control is additionally coupled to receive the temperature sensor signal from the temperature sensor and is further configured to supply the valve commands based additionally upon the temperature sensor signal.

4. The distillation system of claim 2, further comprising:

an engine control in operable communication with the gas turbine engine, and configured to control the operation of the gas turbine engine.

5. The distillation system of claim 4, the valve control and the engine control are integrally formed.

6. The distillation system of claim 4, the valve control and the engine control are disposed within a common housing.

7. The distillation system of claim 1, further comprising:

an exhaust duct coupled between the gas turbine engine and the exhaust gas inlet port, the exhaust duct configured to direct the discharge gas into the exhaust gas inlet port.

8. A method of controlling temperature in a distillation system that comprises a tank, a diffuser, a gas turbine engine, a bypass duct, and a bypass control valve, wherein (i) the tank has a first end wall, a second end wall, a front wall, a back wall, a top wall, and a bottom wall that together define an inner volume, a divider wall disposed within the tank and dividing the inner volume into a main chamber and a settling chamber, the main chamber having at least a fluid inlet port and an exhaust gas inlet port, the exhaust gas inlet port coupled to receive a flow of discharge gas, (ii) the diffuser is disposed within the main chamber and is coupled to the exhaust gas inlet port, (iii) the gas turbine engine is in fluid communication with the exhaust gas inlet port, and includes at least a compressor section, a combustion section, and a turbine section, and is configured, during operation thereof, to discharge exhaust gas, (iv) the bypass duct has a bypass duct inlet disposed between the compressor section and the combustion section to receive compressed air discharged from the compressor section, and a bypass duct outlet disposed downstream of the turbine section, (v) the bypass control valve is mounted on the bypass duct and is movable to a commanded valve position, and wherein the method comprises the steps of:

sensing, via a temperature sensor, temperature of the discharge gas supplied to the exhaust gas inlet port and supplying a temperature signal indicative of the sensed temperature; and commanding, via a valve control in operable communication with the temperature sensor and the bypass control valve, the bypass control valve to move to a commanded position based at least in part on the temperature sensor signal, to thereby control:

(i) an amount of compressed air that flows through the bypass duct and mixes with exhaust gas discharged from the turbine section to form the discharge gas that is supplied to the main chamber, and (ii) the temperature of the discharge gas.

* * * * *